No. 841,166. PATENTED JAN. 15, 1907.
J. MOORE.
TEDDER ATTACHMENT TO MOWING MACHINES.
APPLICATION FILED JAN. 4, 1906.

2 SHEETS—SHEET 1.

Witnesses
J. S. Edmunds
A. Byrick

Inventor
John Moore
By P. J. Edmunds
Attorney

No. 841,166. PATENTED JAN. 15, 1907.
J. MOORE.
TEDDER ATTACHMENT TO MOWING MACHINES.
APPLICATION FILED JAN. 4, 1906.

2 SHEETS—SHEET 2.

Witnesses
I. S. Edmunds
A. Byrick

Inventor
John Moore
By P. J. Edmunds
Attorney

UNITED STATES PATENT OFFICE.

JOHN MOORE, OF LONDON TOWNSHIP, ONTARIO, CANADA.

TEDDER ATTACHMENT TO MOWING-MACHINES.

No. 841,166.  Specification of Letters Patent.  Patented Jan. 15, 1907.

Application filed January 4, 1906. Serial No. 294,673.

*To all whom it may concern:*

Be it known that I, JOHN MOORE, a subject of the King of Great Britain, and a resident of the township of London, in the county of Middlesex, in the Province of Ontario, Canada, have invented a new and useful Tedder Attachment to Mowing-Machines, of which the following is a specification.

This invention relates to a tedder attachment to mowing-machines by the use of which the hay is shaken up as fast as it is cut, the object being to provide a tedder attachment to mowing-machines that will be simple, strong, and durable in construction, one that will be inexpensive to manufacture, one that will perform the operation of shaking up the hay thoroughly and well and as fast as it is cut, one that may be readily and easily attached, and in an inexpensive manner to a mowing-machine of any class or manufacture, one that can be readily and easily adjusted to a higher or lower position and thus instantly adapt it to the height of the horses drawing the mower, one the construction of which permits the tedder-forks to be adjusted and operated so close to the mower when in their lower position that they will not strike the ground when the machine is passing over inequalities of rough or smooth ground or on the movement up and down of the tongue as the horses are traveling over rough or uneven ground; and it consists of the improved construction and novel combination of parts of the same, as will be hereinafter first fully set forth and described and then pointed out in the claims, reference being had to the accompanying drawings, wherein—

Figure 1:
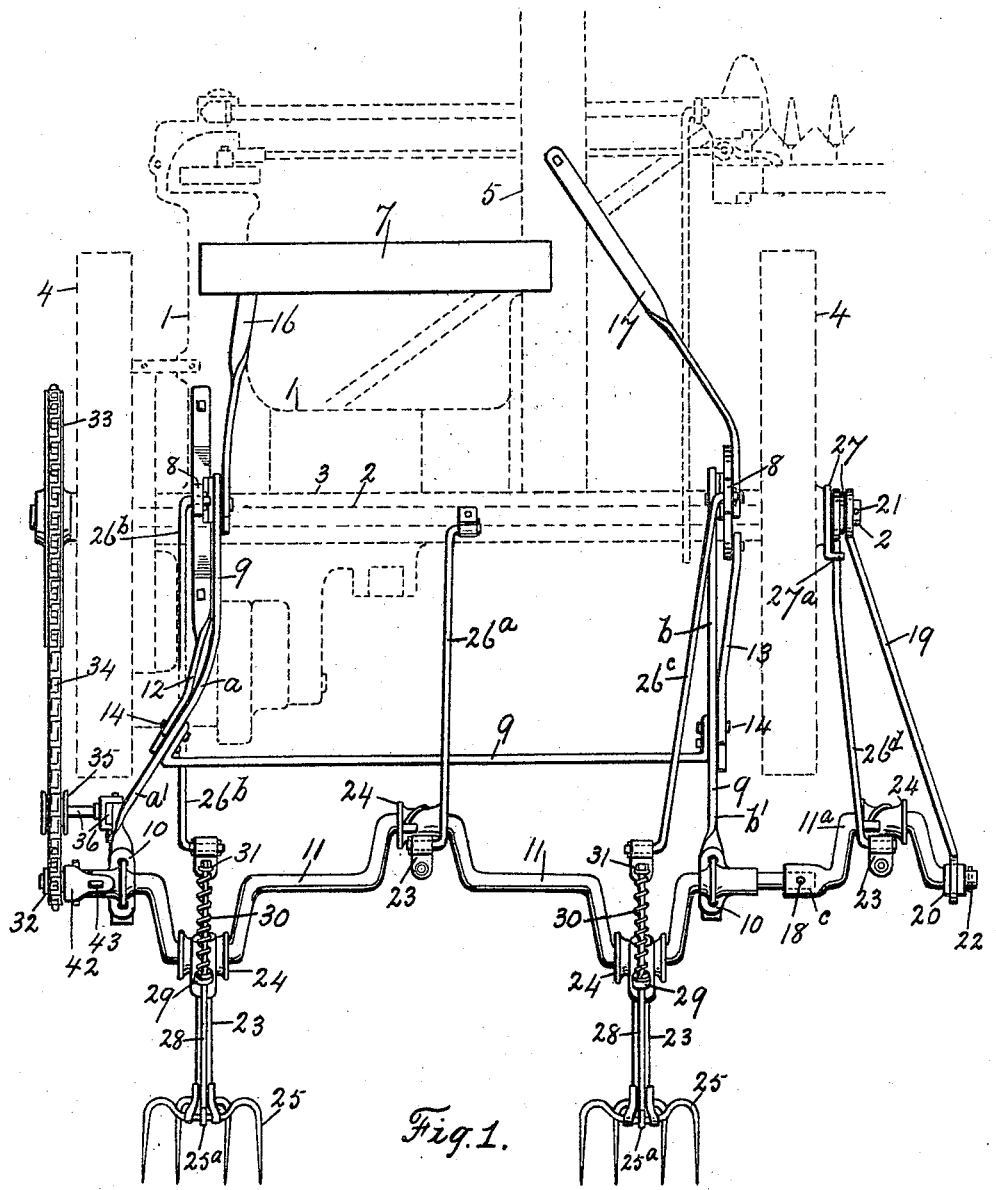
Figure 2:
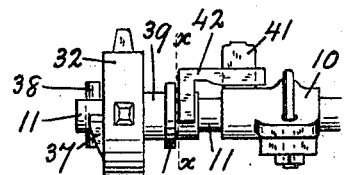
Figure 3:
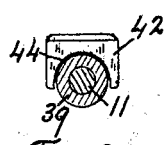
Figure 4:
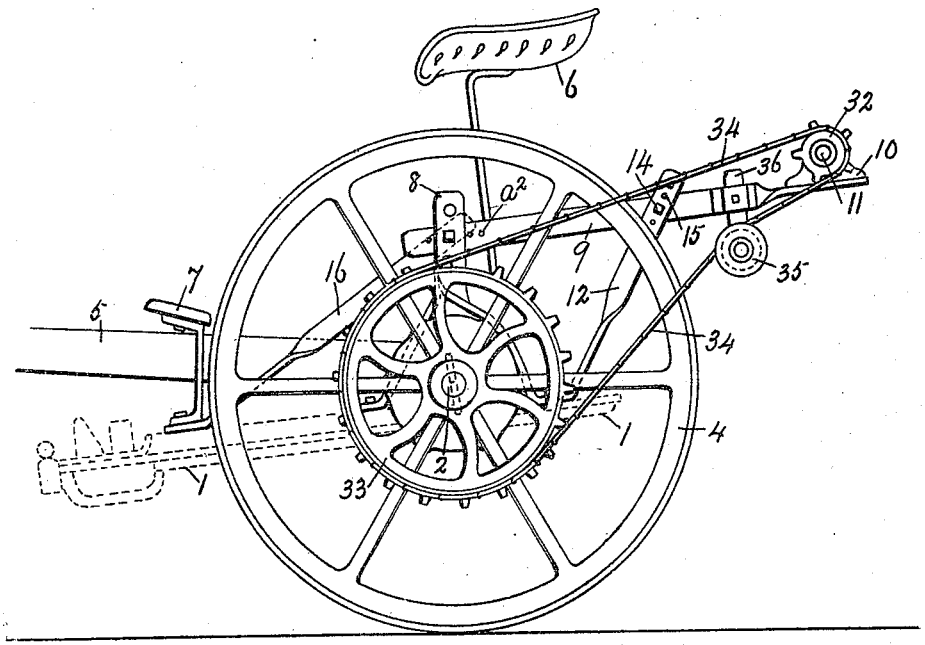
Figure 5:
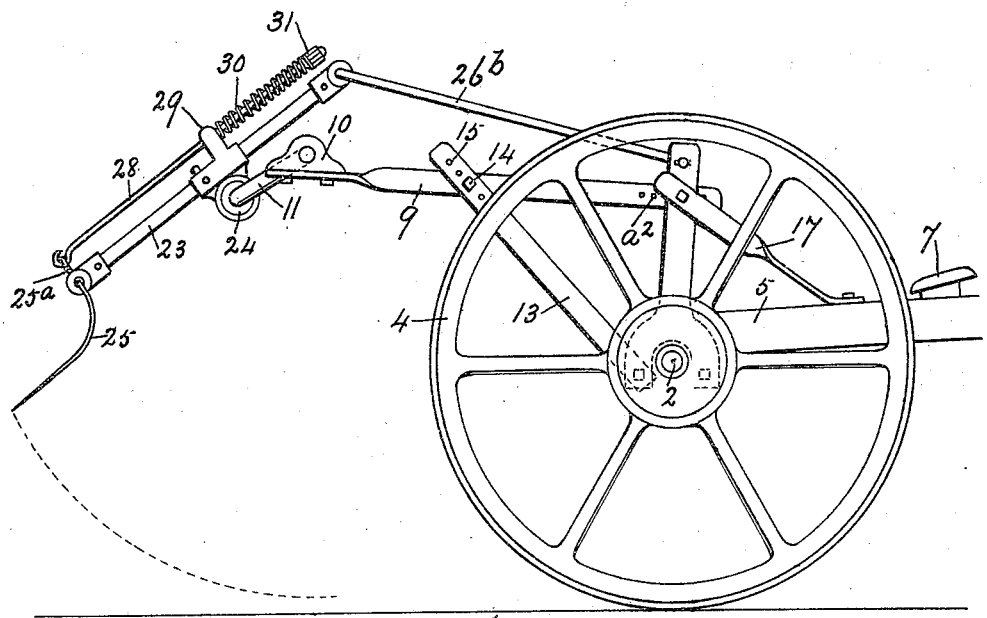

Figure 1 is a plan view of a mowing-machine and of my improved tedder attachment in connection therewith. In this view the mowing-machine is shown in dotted lines and the tedder attachment in solid lines. Fig. 2 is an enlarged detail rear side view of the device which throws the tedder attachment in or out of operation. Fig. 3 is a cross-sectional view on the line $xx$ of Fig. 2. Fig. 4 is a side view of Fig. 1 looking at it from the gear side. In this view the tedder crank-shaft and attachments are not shown, and the mowing-machine frame is shown in dotted lines. Fig. 5 is another side view of Fig. 1 looking at it from the opposite side to that shown in Fig. 4. In this view the tedder-fork and attachments outside of the driving-wheel and the mower-frame are removed.

In the accompanying drawings, the numeral 1 designates the main frame; 2 the main axle; 3, the barrel of the frame through which the main axle extends; 4, the driving-wheels, and 5 the tongue of the mowing-machine.

6 designates the seat, and 7 the foot-rest, for the driver.

8 designates the standards, which are bolted, or otherwise rigidly secured at their lower ends to the main frame 1 of the mower at opposite sides of the machine.

9 designates a U-shaped tedder-frame, the front ends of the side bars $a$ $b$ of which are each provided with a series of bolt-holes $a^2$, through one of which and a bolt-hole in the standard 8 a bolt extends, by which said tedder-frame 9 is bolted and pivotally secured to the standards 8, as shown in Figs. 4 and 5.

$a'$ and $b'$ designate rearward extensions of the side bars $a$ $b$ of said tedder-frame 9, and 10 designates bearing-boxes secured to and near the outer ends of said extensions.

11 designates a tedder crank-shaft, which is supported by, held in place, and revolves perfectly free in said bearing-boxes 10.

12 and 13 designate braces, one of which is bolted and firmly secured at one end to each of the standards 8, which braces extend upward and rearward in an inclined direction, and their other ends are bolted by the bolts 14 to the side bars $a$ $b$ of the tedder-frame 9.

15 designates a series of bolt-holes formed in said rearwardly-extending braces 12 and 13 near their upper ends, to which the bolts 14 are fitted for the purpose which will be hereinafter set forth.

16 and 17 designate braces, each of which is secured at one end to a standard 8 and at their other ends to the mower-frame 1 and tongue 5, respectively, to further assist in rigidly and firmly holding and bracing the standards 8 in proper position.

$11^a$ designates an extension of the tedder-crank-shaft 11, in which extension $11^a$ a socket $c$ is formed, to which the adjacent end of the tedder crank-shaft 11 is fitted and into which it is inserted, and when so placed the extension $11^a$ is rigidly secured to the tedder crank-shaft 11 by a bolt or pin 18.

19 designates a brace which is secured at one end to a collar or sleeve 20 on the extension crank-shaft $11^a$ near its outer end, and the other end of said brace 19 loosely encircles the main axle 2 of the mower and is held on the latter by the bolt or pin 21, and 22 designates a bolt or pin which secures said collar or sleeve 20 on said extension crank-shaft 11ª.

23 designates the handles of the tedder-forks 25, which handles are secured to the boxes 24, and the latter are mounted on the tedder crank-shafts 11 and 11ª, and in the lower end of each of said tedder-fork handles 23 a tedder-fork 25, provided with a lug 25ª, is pivotally mounted, and to the upper end of each of said tedder-fork handles 23 one end of a rod is pivotally secured, and the other end of one of said rods 26ª is pivotally secured to the frame 1 of the mower. The other ends of the rods 26ᵇ and 26ᶜ are pivotally secured to the upper ends of the standards 8, and the other end of the rod 26ᵈ encircles a collar 27 on the main axle 2, and said collar 27 is held from turning on said axle 2 by the rod 26ᵈ, projecting between the flanges 27ª, formed on one side of said collar 27, which it encircles.

28 designates a rod, which is fitted to and extends through a hole in the flange 29 on the tedder-fork handle 23, and the lower end of this rod 28 is pivotally secured to the lug 25ª on the tedder-fork 25, and 30 is a coil-spring encircling said rod 28 between a shoulder 31 on the upper end of said rod 28 and said flange 29 on said tedder-fork handle 23. When in operation, this construction permits the tedder-fork 25 to give back and free itself if it should engage with an unyielding obstruction.

32 designates a sprocket-wheel, (shown in Figs. 1 and 4,) which sprocket-wheel when the tedder attachment is not in operation revolves freely on the tedder crank-shaft 11. 33 designates a sprocket-wheel rigidly secured to the main axle 2 of the mower, and 34 a chain belt, which passes over said sprocket-wheels 32 and 33 to communicate motion directly from the main axle 2 of the mower to the tedder crank-shaft 11.

35 designates a tightener-pulley mounted on an arm 36, which arm is adjustably secured to the extension a' of the tedder-frame 9.

The tedder attachment is thrown into and out of operation by means of a clutch mechanism, which is constructed and operates as follows: 37 designates a shoulder formed on the outer side of the sprocket-wheel 32, and 38 designates a pin which is secured in the tedder crank-axle 11 to hold said sprocket-wheel 32 on said axle, and with this pin 38 the shoulder 37 is adapted to engage. 39 designates a sleeve secured to the inner side of the sprocket-wheel 32, and 40 designates a flange which extends around said sleeve 39 about midway between its ends. 41 designates a lug formed on the bearing-box 10 adjacent to the sprocket-wheel 32. 42 designates a clutch-arm, in which an opening 43 is formed, to which opening 43 the lug 41 is fitted, and in the downwardly-extending portion of said clutch-arm 42 a recess 44 is formed, which is fitted to and clasps the sleeve 39. When clutch-arm 42 is adjusted as shown in Fig. 2, it engages with the shoulder 40 on sleeve 39 to hold the shoulder 37 on the sprocket-wheel 32 in the path of the pin 38, secured in tedder crank-shaft 11. Consequently when the chain belt operates the sprocket-wheel 32 the tedder crank-shaft 11 is operated and the tedder attachment thrown in gear or operation; but by raising clutch-arm 42 clear from lug 41 and adjusting the end of sleeve 39 in contact with box 10 the sprocket-wheel 32 is moved back from and the shoulder 37 is moved out of the way of the pin 38. Then by replacing clutch-arm 42 it engages with lug 41 and the side of the flange 40 on sleeve 39 adjacent to sprocket-wheel 32, and this holds the end of sleeve 39 against box 10 and holds shoulder 37 out of the path of pin 38, and this operation throws and holds the tedder attachment out of gear or operation.

The operation, which is very simple, is as follows: As the horses draw the mower over the ground to cut the grass or hay the driving-wheels 4 revolve and cause the main axle 2 to revolve, as well as the sprocket-wheel 33, which is rigidly secured directly to said main axle 2, and as the sprocket-wheel 33 revolves motion is communicated from the main axle 2 of the mower directly to the tedder crank-shaft 11 by the chain belt 34, passing over the sprocket-wheel 33 on the main axle 2 and over the sprocket-wheel 32 on the tedder crank-shaft 11, and the tedder-forks 25 being pivotally mounted on said crank-axle 11 and their upper ends being connected to the mower-frame or other fixed part by the rods 26 as the tedder crank-shaft 11 operates these forks 25 toss and shake up the cut grass or hay, so as to spread it loosely for drying, and at the same time as the mower is cutting the swath of grass or hay succeeding or adjacent to or side by side with the swath that is being teddered.

The advantages of communicating motion directly from the main axle 2 to the tedder crank-shaft 11 by a single chain belt 34, passing over the sprocket-wheels 33 and 32 on the main axle 2 and tedder crank-shaft 11, respectively, are that a very simple, strong, and durable tedder attachment to mowing-machines is provided, and motion being communicated directly from the main axle to the tedder crank-shaft by the single chain belt 34, passing over the sprocket-wheels 32 and 33 without any intervening counter-shafts or other operative parts permits the tedder-forks to be adjusted and operated close to the driving-wheels of the mower, the advantage of which is apparent when the tedder-forks are in their lower position, their radius from the main axle 2 being so short that they will not strike the ground or the inequalities of rough or smooth ground when in operation or on the movement up and down of the front end of the tongue as the horses are traveling over uneven ground. Again, the sprocket-wheel 33 being fixed directly on the main axle 2 the tedder attachment will operate when either of the driving-wheels 33 are turning, whereas if the sprocket-wheel 33 was secured to the spokes or arms of one of the driving-wheels, if the driving-wheel to which the sprocket-wheel was attached was the pivot-wheel, of the mower when turning the tedder would not operate, although the outer wheel and axle would be in operation drring the operation of turning. Again, if larger or smaller sized horses were being used on the machine than those to which the machine had been formerly set for and the front end of the tongue thereby raised to cause the tedder-forks 25 to come in contact with the ground when in operation, or if the front end of the tongue was lowered to cause the tedder-forks 25 to rise, so that they would not shake and toss up all the hay, both of these difficulties could be readily and easily overcome by removing the bolt 14 and raising or lowering the tedder-frame 9 and projecting said bolt 14 through a bolt-hole 15 higher or lower in said braces 12 and 13 and through the adjacent bolt-hole in said tedder-frame 9

Again, the bolt-holes $a'$ in the side bars $a$ and $b$ of the tedder-frame 9 permit the latter to be adjusted to excessive variations in the chain belt 34 if the latter should be too long or if a link should break, which is then held tight or in operative connection with the sprocket-wheels 32 and 33 by the tightener-pulley 35.

Having thus described my invention, I claim—

1. In a tedder attachment to mowing-machines, standards adapted to be attached and rigidly secured to the main frame of the mowing-machine, and a tedder-frame pivotally secured to said standards at its front end, in combination with rearwardly and upwardly extending inclined braces provided with a series of holes and secured at one of their ends to said standards and at their other ends to said tedder-frame by bolts, one of said bolts projecting through one of said series of holes in one of each of said inclined braces and through a bolt-hole in the adjacent side of the tedder frame, a tedder crank-shaft, and an extension for the tedder crank-shaft, in combination with the main axle of the mowing-machine, and braces connecting said extension with said axle, substantially as shown and described and for the purpose specified.

2. In a tedder attachment to mowing-machines, standards adapted to be rigidly secured to the main frame of the mowing-machine, and a tedder-frame provided with a series of bolt-holes and secured at its front end to said standards by bolts, one of said bolts projecting through one of said series of holes in each side of said tedder-frame and a bolt-hole in the standard adjacent thereto, in combination with inclined braces secured at one of their ends to said standards and at their other ends to said tedder-frame, a tedder crank-shaft, and an extension for said shaft in combination with the main axle of the mowing-machine, and a brace connecting said extension with said axle, substantially as shown and described and for the purpose specified.

3. In a tedder attachment to mowing-machines, standards adapted to be rigidly secured to the main frame of the mowing-machine, and a tedder-frame provided with a series of bolt-holes and secured at its front end to said standards by bolts, one of said bolts projecting through one of said series of holes in each side of said tedder-frame and a bolt-hole in the standard adjacent thereto, in combination with inclined braces provided with a series of holes and secured at one of their ends to said standards and at their other ends to said tedder-frame by bolts one of said bolts projecting through one of said series of holes in one of each of said inclined braces and through a bolt-hole in the adjacent side of said tedder-frame, a main frame downwardly and forwardly extending inclined braces secured at one of their ends to said standards and at their other ends to said main frame, a tedder crank-shaft, and an extension for said shaft in combination with the main axle of the mowing-machine, and connections between said extension and main axle, substantially as shown and described and for the purpose specified.

4. In a tedder attachment to mowing-machines, a tedder crank-shaft, an extension of said tedder crank-shaft adapted to be firmly attached to or detached from said tedder crank-shaft, and a sleeve secured to said extension of said tedder crank-shaft, in combination with the main axle of the mowing-machine and a brace one end of which encircles said sleeve on said extension of said tedder crank-shaft and its other end encircling said main axle, substantially as shown and for the purpose specified.

5. In a tedder attachment to mowing-machines, a tedder crank-shaft, an extension of said tedder crank-shaft adapted to be firmly attached to or detached from said tedder crank-shaft, and means for bracing and holding said extension of said tedder crank-shaft in position, in combination with a tedder-fork handle mounted on said extension of said tedder crank-shaft, a collar mounted on the main axle of the mowing-machine, and provided with lateral flanges, and a rod secured at one end to the upper end of the tedder-fork handle and its other end extending between said flanges and encircling said collar, substantially as shown and described and for the purpose specified.

6. In a tedder attachment to mowing-machines, a tedder crank-shaft, an extension of said tedder crank-shaft adapted to be firmly attached to or detached from said tedder crank-shaft, a tedder-fork handle mounted on said extension of said tedder crank-shaft, a collar provided with lateral flanges and mounted on the main axle of the mowing-machine, and a rod secured at one end to the upper end of said tedder-fork handle and its other end extending between said flanges and encircling said collar, in combination with a sleeve on said extension of said tedder crank-shaft, and a brace one end of which encircles said sleeve and its other end encircling the main axle of the mowing-machine, substantially as shown and described and for the purpose specified.

7. In a tedder attachment to mowing-machines, a tedder crank-shaft, an extension of said tedder-shaft adapted to be firmly attached to or detached from said tedder crank-shaft, means for bracing and holding said extension of said tedder crank-shaft in position, a sprocket-wheel on the other end of said tedder crank-shaft, a drive-axle, a sprocket-wheel thereon, a sprocket-chain operating on said sprocket-wheels, clutch mechanism for throwing the crank-shaft into and out of gear with the drive-axle, a tedder-fork handle mounted on said extension of said tedder crank-shaft, a collar mounted on the main axle of the mowing-machine, and provided with lateral flanges, and a rod secured at one end to the upper end of the tedder-fork handle and its other end extending between said flanges and encircling said collar, substantially as described.

In testimony whereof I have signed in the presence of the two undersigned witnesses.

JOHN MOORE.

Witnesses:
P. J. EDMUNDS,
A. BYRICK.